US012773857B2

(12) United States Patent
Shinoda et al.

(10) Patent No.: US 12,773,857 B2
(45) Date of Patent: Oct. 27, 2026

(54) PRINTING APPARATUS AND PRINTING SYSTEM WITH BLOWING PORTION FOR BLOWING AIR TOWARDS PRINTING REGION WHERE LIQUID HAVING SOLVENT IS EJECTED

(71) Applicant: SEIKO EPSON CORPORATION, Tokyo (JP)

(72) Inventors: Tomoki Shinoda, Shiojiri (JP); Ken Inoue, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 176 days.

(21) Appl. No.: 18/592,022

(22) Filed: Feb. 29, 2024

(65) Prior Publication Data

US 2024/0294019 A1 Sep. 5, 2024

(30) Foreign Application Priority Data

Mar. 2, 2023 (JP) ................................ 2023-031669

(51) Int. Cl.
*B41J 11/00* (2006.01)

(52) U.S. Cl.
CPC ........ *B41J 11/0022* (2021.01); *B41J 11/0024* (2021.01)

(58) Field of Classification Search
CPC ................ B41J 11/0022; B41J 11/0024; B41J 11/00216
See application file for complete search history.

(56) References Cited

U.S. PATENT DOCUMENTS

| | | | | |
|---|---|---|---|---|
| 2018/0333971 | A1 | 11/2018 | Sasaki | |
| 2019/0176474 | A1 | 6/2019 | Nakamura | |
| 2021/0078256 | A1* | 3/2021 | Anegawa | B29C 64/295 |
| 2022/0118762 | A1* | 4/2022 | Yoda | B41J 2/14088 |

FOREIGN PATENT DOCUMENTS

| | | | |
|---|---|---|---|
| JP | 2007-216496 | A | 8/2007 |
| JP | 2009-022832 | A | 2/2009 |
| JP | 2018-192690 | A | 12/2018 |
| JP | 2019-104133 | A | 6/2019 |
| JP | 2020-128029 | A | 8/2020 |

* cited by examiner

*Primary Examiner* — Bradley W Thies
(74) *Attorney, Agent, or Firm* — WORKMAN NYDEGGER

(57) ABSTRACT

A printing apparatus includes a medium support portion that supports a medium, a liquid ejecting portion that can perform printing by ejecting a liquid containing a solvent from a nozzle to a printing region of the medium supported by the medium support portion, and a dry air blowing portion that can blow dry air toward the printing region.

16 Claims, 1 Drawing Sheet

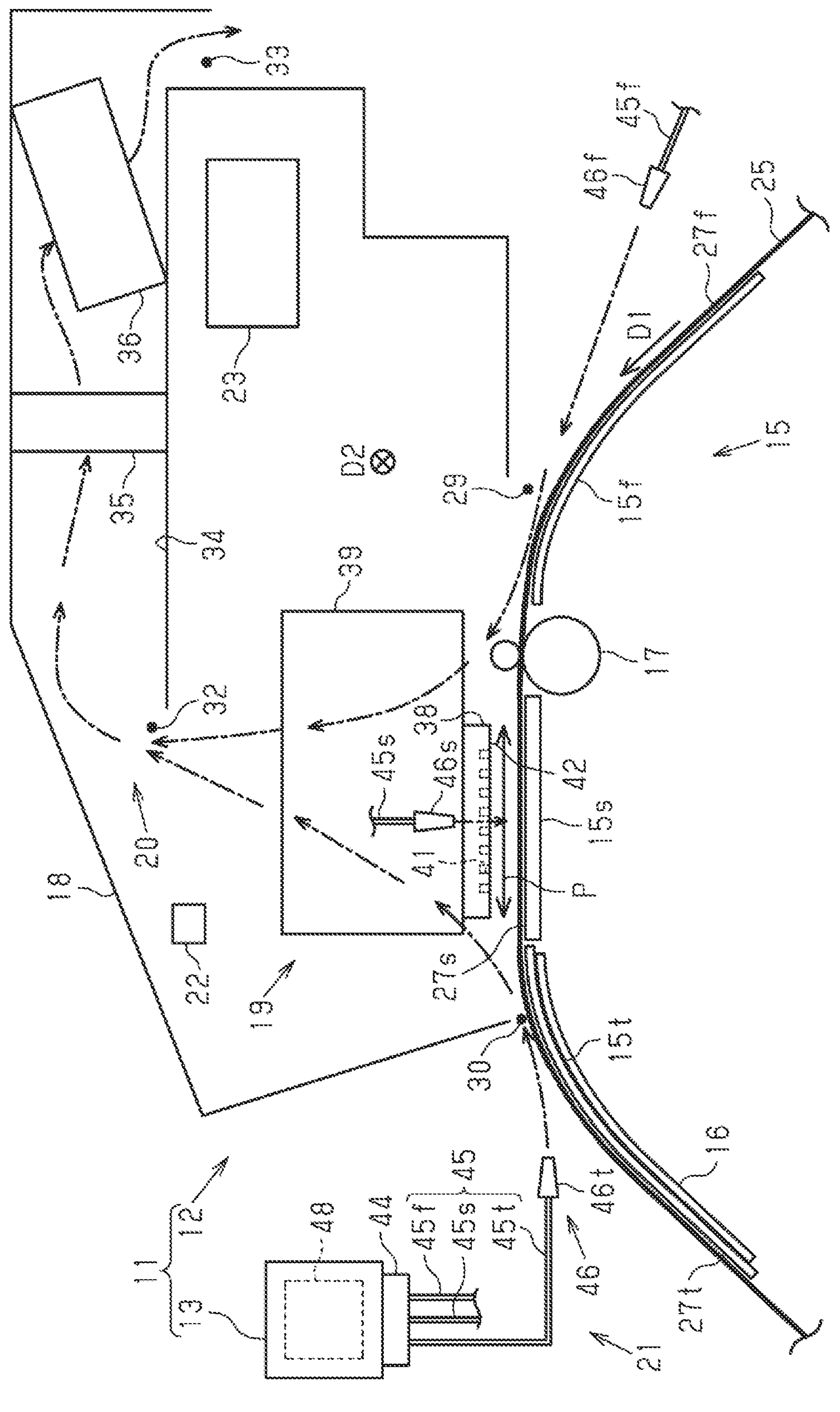
11
12
13
15
15f
15s
15t
16
17
18
19
20
21
22
23
25
27f
27s
27t
29
30
32
33
34
35
36
38
39
41
42
44
45
45f
45s
45t
46
46f
46s
46t
48
D1
D2
P

PRINTING APPARATUS AND PRINTING SYSTEM WITH BLOWING PORTION FOR BLOWING AIR TOWARDS PRINTING REGION WHERE LIQUID HAVING SOLVENT IS EJECTED

The present application is based on, and claims priority from JP Application Serial Number 2023-031669, filed Mar. 2, 2023, the disclosure of which is hereby incorporated by reference herein in its entirety.

BACKGROUND

1. Technical Field

The present disclosure relates to a printing apparatus such as a printer, and a printing system.

2. Related Art

For example, as disclosed in JP-A-2019-104133, there is known a liquid ejecting apparatus that is an example of a printing apparatus that performs printing by ejecting a liquid from a nozzle. The liquid ejecting apparatus includes a humidity adjustment portion that adjusts humidity in the housing.

Some solvent-containing liquids are hygroscopic. For example, when the liquid in the nozzle is exposed to high-humidity air, the liquid absorbs moisture. In the liquid having absorbed moisture, components such as a pigment contained in the liquid may aggregate. However, since the liquid ejecting apparatus of JP-A-2019-104133 is configured to adjust the humidity in the housing, it is difficult to efficiently dehumidify the air around the nozzle.

SUMMARY

A printing apparatus that solves the above problem includes a medium support portion configured to support a medium, a liquid ejecting portion configured to perform printing by ejecting a liquid including a solvent from a nozzle to a printing region of the medium supported by the medium support portion, and a dry air blowing portion configured to blow dry air toward the printing region.

A printing system that solves the above problem includes a printing apparatus including a medium support portion configured to support a medium, a liquid ejecting portion configured to perform printing by ejecting a liquid including a solvent from a nozzle to a printing region of the medium supported by the medium support portion, and a dry air blowing portion configured to blow dry air toward the printing region, and a dry air generation device configured to generate the dry air, in which the dry air blowing portion includes a flow path having one end coupled to the dry air generation device, and a dry air blowing nozzle coupled to the other end of the flow path.

BRIEF DESCRIPTION OF THE DRAWINGS

FIG. 1 is a schematic diagram of an embodiment of a printing system including a printing apparatus.

DESCRIPTION OF EMBODIMENTS

First Embodiment

An embodiment of a printing apparatus and a printing system will be described below with reference to the drawings. The printing apparatus is an ink-jet printer that records images of letters, photographs, and others by ejecting ink that is an example of liquid to a medium such as fabric and a sheet, for example. The liquid is ink in which a solvent is a main solvent and a pigment is dispersed in the solvent, that is, so-called eco-solvent ink.

Printing System

As illustrated in FIG. 1, the printing system 11 includes a printing apparatus 12 and a dry air generation device 13.

Printing Apparatus

The printing apparatus 12 may include a medium support portion 15, a medium heating portion 16, a conveyance portion 17, a housing 18, a printing portion 19, an exhaust portion 20, a dry air blowing portion 21, a temperature detection portion 22, and a control portion 23.

The medium support portion 15 is configured to support a medium 25. The medium support portion 15 of the present embodiment includes a first support table 15*f*, a second support table 15*s*, and a third support table 15*t*.

The first support table 15*f*, the second support table 15*s*, and the third support table 15*t* are plate-like members, for example. The first support table 15*f*, the second support table 15*s*, and the third support table 15*t* support the medium 25 from below. The first support table 15*f*, the second support table 15*s*, and the third support table 15*t* are arranged in this order in a conveyance direction D1 in which the medium 25 is conveyed.

The first support table 15*f* includes a first support surface 27*f* that comes into contact with the medium 25. The first support table 15*f* is positioned upstream of the conveyance portion 17 in the conveyance direction D1.

The second support table 15*s* includes a second support surface 27*s* that comes into contact with the medium 25. The second support table 15*s* is positioned downstream of the conveyance portion 17 in the conveyance direction D1.

The third support table 15*t* includes a third support surface 27*t* that comes into contact with the medium 25. The third support table 15*t* is positioned downstream of the conveyance portion 17 in the conveyance direction D1. The third support table 15*t* is positioned downstream of the second support table 15*s* in the conveyance direction D1. That is, the conveyance portion 17 is positioned between the first support table 15*f* and the second support table 15*s* in the conveyance direction D1.

In the present embodiment, the medium 25 is conveyed along the first support surface 27*f*, the second support surface 27*s*, and the third support surface 27*t*. Therefore, in the present embodiment, the conveyance direction D1 is a direction extending along the first support surface 27*f*, the second support surface 27*s*, and the third support surface 27*t*.

The medium heating portion 16 may be provided in the medium support portion 15. For example, the medium heating portion 16 is provided on the third support table 15*t*. The medium heating portion 16 may heat the printed medium 25 by heating the third support table 15*t*.

The conveyance portion 17 is configured to convey the medium 25. The conveyance portion 17 may transport the medium 25 by a pair of rollers rotating in a state in which the medium 25 is interposed therebetween. The conveyance portion 17 may convey the medium 25 to pull out the medium 25 from a roll body (not illustrated) on which the medium 25 before printing is wound.

The housing 18 is configured to accommodate the printing portion 19 and the exhaust portion 20.

The printing apparatus 12 includes a medium introduction portion 29 and a medium lead-out portion 30. The medium introduction portion 29 introduces the medium 25 before printing into the housing 18. The housing 18 forms the medium introduction portion 29 between the housing 18 and the first support table 15*f*. The medium introduction portion 29 of the present embodiment is a space between the housing 18 and the first support table 15*f*. The medium lead-out portion 30 leads the printed medium 25 to the outside of the housing 18. The housing 18 forms the medium lead-out portion 30 between the housing 18 and the third support table 15*t*. The medium lead-out portion 30 of the present embodiment is a space between the housing 18 and the third support table 15*t*.

The exhaust portion 20 guides dry air supplied into the housing 18 from an air inlet 32 to an air outlet 33. In FIG. 1, the flow of dry air is indicated by alternate long and short dash lines. The exhaust portion 20 may include an exhaust path 34, a filter 35, and a fan 36.

The exhaust path 34 links the air inlet 32 and the air outlet 33. The air inlet 32 may face the printing portion 19. The air inlet 32 may be positioned above the printing portion 19. The air inlet 32 may be provided having a wide width and facing a printing region P over a scanning direction D2.

The filter 35 may be provided in the exhaust path 34. The filter 35 captures mist and the like. The fan 36 may be provided in the exhaust path 34 between the filter 35 and the air outlet 33. The fan 36 blows air toward the air outlet 33.

The printing portion 19 may include a liquid ejecting portion 38 and a carriage 39.

The liquid ejecting portion 38 is configured to eject a liquid. A nozzle 41 is opened in the liquid ejecting portion 38. Specifically, the liquid ejecting portion 38 includes a nozzle surface 42 in which one or more nozzles 41 are opened. In the present embodiment, a region between the medium support portion 15 and the nozzle surface 42 is also referred to as printing region P. The printing region P is a region sandwiched between the nozzle surface 42 and the second support table 15*s* in a direction perpendicular to the nozzle surface 42.

The liquid ejecting portion 38 ejects a liquid containing a solvent from the nozzle 41 onto the printing region P of the medium 25 supported by the medium support portion 15. The liquid ejecting portion 38 can perform printing by ejecting a liquid onto the medium 25.

The carriage 39 is equipped with the liquid ejecting portion 38. The carriage 39 is movable in the scanning direction D2. The carriage 39 is configured to scan the medium 25. The liquid ejecting portion 38 ejects a liquid while the carriage 39 performs scanning, whereby an image is printed on the medium 25. That is, the liquid ejecting portion 38 of the present embodiment is a serial type that scans the medium 25. The liquid ejecting portion 38 may be of a line type that is provided extending longer than the width of the medium 25.

The temperature detection portion 22 is configured to detect a temperature. The temperature detection portion 22 may detect the temperature outside the housing 18. The temperature detection portion 22 may detect the temperature inside the housing 18. The temperature detection portion 22 may detect the temperature of the supplied dry air. The temperature detection portion 22 may detect the temperature of the exhausted dry air.

The control portion 23 integrally controls driving of each mechanism in the printing apparatus 12 or the printing system 11, and controls various operations executed in the printing apparatus 12 or the printing system 11.

The control portion 23 may be configured as a circuit including α: one or more processors that execute various processes in accordance with a computer program, β: one or more dedicated hardware circuits that execute at least some of the various processes, or γ: a combination thereof. The hardware circuit is an application-specific integrated circuit, for example. The processor includes a CPU and memories such as a RAM and a ROM, and the memories store program codes or commands configured to cause the CPU to perform processing. The memories, that is, computer-readable media, include all readable media that can be accessed by a general-purpose or special-purpose computer.

The dry air blowing portion 21 can blow dry air toward the printing region P. The dry air blowing portion 21 may include a dry air heating portion 44, one or more flow paths 45, and one or more dry air blowing nozzles 46.

The dry air heating portion 44 heats dry air. The dry air heating portion 44 may be provided between the flow path 45 and the dry air generation device 13. The flow path 45 may be coupled to the dry air generation device 13 via the dry air heating portion 44.

The dry air blowing portion 21 may include a plurality of the flow paths 45. The dry air blowing portion 21 of the present embodiment includes three flow paths 45. When the three flow paths 45 are distinguished from one another, they are also referred to as a first flow path 45*f*, a second flow path 45*s*, and a third flow path 45*t*.

The dry air blowing portion 21 may include a plurality of the dry air blowing nozzles 46 in the scanning direction D2. The dry air blowing portion 21 of the present embodiment includes the same number of the dry air blowing nozzles 46 as the number of the flow paths 45. When the three dry air blowing nozzles 46 are distinguished from one another, they are also referred to as a first blowing nozzle 46*f*, a second blowing nozzle 46*s*, and a third blowing nozzle 46*t*. The dry air blowing nozzle 46 may be provided having a wide width in the scanning direction D2. The dry air blowing nozzle 46 may be provided having such a width as to be capable of corresponding to the printing region P.

The dry air blowing nozzle 46 includes a blow-out port (not illustrated) through which dry air is blown out, at a leading end. The cross-sectional area of the blow-out port may be smaller than the cross-sectional area of the flow path 45. Narrowing the port makes it easy to determine the direction in which the dry air is blown.

The flow path 45 has one end coupled to the dry air generation device 13. The flow path 45 has the other end coupled to the dry air blowing nozzle 46. Specifically, the first flow path 45*f* has one end coupled to the dry air generation device 13 and the other end coupled to the first blowing nozzle 46*f*. The second flow path 45*s* has one end coupled to the dry air generation device 13 and the other end coupled to the second blowing nozzle 46*s*. The third flow path 45*t* has one end coupled to the dry air generation device 13 and the other end coupled to the third blowing nozzle 46*t*.

The dry air blowing portion 21 may blow dry air from the medium introduction portion 29 toward the printing region P. The first blowing nozzle 46*f* may blow dry air toward the medium introduction portion 29. The first blowing nozzle 46*f* may blow dry air toward the medium 25 introduced into the medium introduction portion 29. The dry air having hit the medium 25 flows to the printing region P along the medium 25. A plurality of the first blowing nozzles 46*f* may be provided in the scanning direction D2. The first blowing nozzle 46*f* may be provided having a wide width in the scanning direction D2. The first blowing nozzle 46*f* may be provided having such a width as to be capable of corresponding to the printing region P.

The dry air blowing portion 21 may be provided on the carriage 39. The second blowing nozzle 46*s* is provided on the carriage 39. The second blowing nozzle 46*s* moves in the scanning direction D2 together with the liquid ejecting portion 38 in accordance with the movement of the carriage 39. The second blowing nozzle 46*s* may be provided outside the printing region P. The second blowing nozzle 46*s* may be provided above the printing region P. The second blowing nozzle 46*s* may blow dry air toward the printing region P by blowing obliquely to the medium 25.

The dry air blowing portion 21 may include a plurality of the second blowing nozzles 46*s*. For example, the plurality of second blowing nozzles 46*s* may be provided on both sides in the scanning direction D2 with the plurality of second blowing nozzles 46*s* sandwiching the liquid ejecting portion 38 in the scanning direction D2. The plurality of second blowing nozzles 46*s* may be provided side by side in the conveyance direction D1. The second blowing nozzle 46*s* may be provided upstream of the liquid ejecting portion 38 in the conveyance direction D1. The second blowing nozzle 46*s* may be provided downstream of the liquid ejecting portion 38 in the conveyance direction D1. The plurality of second blowing nozzles 46*s* may be provided side by side in the scanning direction D2.

The dry air blowing portion 21 may blow dry air from the medium lead-out portion 30 toward the printing region P. The third blowing nozzle 46*t* may blow dry air toward the medium lead-out portion 30. The third blowing nozzle 46*t* may blow dry air toward the medium 25 led out from the medium lead-out portion 30. The dry air having hit the medium 25 flows to the printing region P along the medium 25. A plurality of the third blowing nozzles 46*t* may be provided in the scanning direction D2. The third blowing nozzle 46*t* may be provided having a wide width in the scanning direction D2. The third blowing nozzle 46*t* may be provided having such a width as to be capable of corresponding to the printing region P.

Dry Air Generation Device

The dry air generation device 13 can generate dry air. The dry air generation device 13 includes a dry air generation portion 48 that can generate dry air. The dry air generation portion 48 may generate dry air from the atmosphere inside the housing 18, or may generate dry air from the atmosphere outside the housing 18.

The dry air generation device 13 cools the taken atmosphere to condense water vapor in the atmosphere. Thus, the dry air generation device 13 dehumidifies the taken atmosphere. The dry air generation device 13 generates dry air by returning the cooled atmosphere to room temperature. For example, the dry air generation device 13 cools the taken atmosphere with a coolant. The coolant is water, gas, or the like. The dry air generation device 13 returns the cooled atmosphere to room temperature by exchanging heat between the taken atmosphere and the cooled atmosphere, for example.

The dry air generation device 13 supplies the generated dry air to the dry air blowing portion 21. In one example, the dry air generation device 13 is coupled to an upstream end, which is an example of one end of the flow path 45. Thus, the dry air generation device 13 can effectively supply dry air to the dry air blowing portion 21.

Operations of Embodiment

Operations of the present embodiment will be described.

The dry air blowing portion 21 supplies dry air toward the printing region P. When the dry air is supplied by the dry air blowing portion 21, the atmosphere of the printing region P is replaced with the dehumidified dry air. The atmosphere containing moisture and mist is discharged to the outside of the housing 18 by the exhaust portion 20. The dry air blowing portion 21 reduces the moisture and mist contained in the atmosphere of the printing region P to which the nozzles 41 are exposed. When the water content of the printing region P decreases, the possibility that the liquid in the nozzles 41 may absorb water vapor is reduced, and thus the possibility that the pigment contained in the liquid may be aggregated due to the moisture absorption is reduced.

The printing on the medium 25 is fixed by evaporation of the solvent in the liquid. If the temperature of the atmosphere is low, there is a possibility that the evaporated liquid may condense on the nozzle surface 42, the inside of the housing 18, and the like. However, the dry air is heated by the dry air heating portion 44. The dry air blown from the third blowing nozzle 46*t* is heated by the medium heating portion 16 through the medium 25.

For example, the control portion 23 may control heating performed by the dry air heating portion 44 and the medium heating portion 16. For example, if the temperature detected by the temperature detection portion 22 is lower than a threshold, the control portion 23 may drive at least one of the dry air heating portion 44 or the medium heating portion 16 to heat the dry air.

Advantageous Effects of Embodiment

Advantageous effects of the present embodiment will be described.

(1-1) The liquid ejecting portion 38 ejects a liquid from the nozzles 41 to the printing region P. The dry air blowing portion 21 blows dry air toward the printing region P. Therefore, it is possible to efficiently reduce the possibility that the nozzles 41 may be exposed to high-humidity air.

(1-2) The dry air blowing portion 21 blows dry air toward the printing region P from the medium lead-out portion 30 through which the printed medium 25 is led to the outside. Therefore, it is possible to reduce the possibility that outside air containing water vapor may enter through the medium lead-out portion 30.

(1-3) The printed medium 25 is heated by the medium heating portion 16 to accelerate drying, and is led out from the medium lead-out portion 30. Therefore, the dry air blown from the medium lead-out portion 30 is heated by the medium heating portion 16. Therefore, since the heated dry air is blown to the printing region P, even when the printing apparatus 12 is used in a low temperature environment, for example, it is possible to reduce the possibility that dew condensation may occur around the nozzles 41.

(1-4) The dry air blowing portion 21 blows dry air toward the printing region P from the medium introduction portion 29 into which the medium 25 before printing is introduced. Therefore, it is possible to reduce the possibility that the outside air containing water vapor may enter through the medium introduction portion 29.

(1-5) The dry air blowing portion 21 is provided on the carriage 39 that is movable in the scanning direction D2. Therefore, it is possible to reduce the size of the dry air blowing portion 21 compared to when the dry air blowing portion 21 is provided over the scanning direction D2, for example.

(1-6) The flow path 45 couples the dry air generation portion 48 and the dry air blowing nozzle 46. Since the dry air generation portion 48 can be arranged away from the dry air blowing nozzle 46, the degree of freedom in the arrangement of the dry air generation portion 48 can be increased.

(1-7) The dry air heating portion 44 heats dry air. Since the heated dry air is blown to the printing region P, even when the printing apparatus 12 is used in a low temperature environment, for example, it is possible to reduce the possibility that dew condensation may occur around the nozzles 41.

MODIFIED EXAMPLES

The present embodiment can be modified as described below. The present embodiment and the following modified examples can be implemented in combination with each other without technical contradictions.

The dry air generation portion 48 may be provided in the printing apparatus 12. That is, the printing apparatus 12 may include the dry air generation portion 48. The dry air generation portion 48 may be provided outside the housing 18. The dry air generation portion 48 may be provided in the housing 18. The flow path 45 may have one end coupled to the dry air generation portion 48 and the other end coupled to the dry air blowing nozzle 46.

The printing system 11 or the printing apparatus 12 may include a plurality of the dry air generation portions 48. For example, the first flow path **45*f*, the second flow path 45*s*, and the third flow path 45*t* may be coupled to different dry air generation portions 48. Some of the dry air generation portions 48 included in the printing system 11 may be included in the printing apparatus 12. That is, the printing system 11 may include the printing apparatus 12 including the dry air generation portion 48 and the dry air generation device 13 including the dry air generation portion 48**.

In the dry air blowing portion 21, one flow path 45 may fork and be coupled to a plurality of the dry air blowing nozzles 46. For example, the first flow path **45*f* may be coupled to the first blowing nozzle 46*f* and the second blowing nozzle 46*s***.

The dry air heating portion 44 may be provided in the middle of the flow path 45. The dry air heating portion 44 may be provided between the flow path 45 and the dry air blowing nozzle 46.

The printing apparatus 12 may include a plurality of the dry air heating portions 44. For example, the dry air in the first flow path **45*f*, the second flow path 45*s*, and the third flow path 45*t* may be heated by separate dry air heating portions 44**.

The printing apparatus 12 may include at least one of the dry air heating portion 44 or the medium heating portion 16, or may include none of them.

The dry air generation device 13 may include the dry air heating portion 44.

The medium heating portion 16 may heat at least one of the first support table **15*f*, the second support table 15*s*, or the third support table 15*t*. The medium heating portion 16 may heat the medium 25 before printing by heating the first support table 15*f*. The medium heating portion 16 may heat the dry air blown from the first blowing nozzle 15*f* through the medium 25 by heating the first support table 46*f*. The medium heating portion 16 may heat the medium 25 in the printing region P by heating the second support table 15*s***.

The dry air blowing portion 21 may include any one or any two of the first blowing nozzle **46*f*, the second blowing nozzle 46*s*, and the third blowing nozzle 46*t*. The dry air blowing portion 21 may not include the dry air blowing nozzle 46. In this case, the other end of the flow path 45 whose one end is coupled to the dry air generation device 13 or the dry air generation portion 48** may be arranged to face the printing region P.

The dry air blowing nozzle 46 may be provided in the housing 18. The dry air blowing nozzle 46 may be provided separately from the carriage 39.

DEFINITIONS

The expression "at least one" used herein means "one or more" of desired options. As an example, the expression "at least one" used herein means "only one option" or "both of two options" if the number of options is two. As another example, the expression "at least one" used herein means "only one option" or "a combination of two or more freely selected options" if the number of options is three or more.

SUPPLEMENTARY NOTES

Hereinafter, technical ideas and effects thereof obtained from the above-described embodiments and modification examples will be described.

(A) A printing apparatus includes a medium support portion that supports a medium, a liquid ejecting portion that can perform printing by ejecting a liquid containing a solvent from a nozzle to a printing region of the medium supported by the medium support portion, and a dry air blowing portion that can blow dry air toward the printing region.

According to this configuration, the liquid ejecting portion ejects the liquid from the nozzle to the printing region. The dry air blowing portion blows the dry air toward the printing region. Therefore, it is possible to efficiently reduce the possibility that the nozzles may be exposed to high-humidity air.

(B) In the printing apparatus according to (A), the dry air blowing portion may blow the dry air toward the printing region from a medium lead-out portion through which the printed medium is led out to the outside.

According to this configuration, the dry air blowing portion blows the dry air toward the printing region from the medium lead-out portion through which the printed medium is led out to the outside. Therefore, it is possible to reduce the possibility that outside air containing water vapor may enter through the medium lead-out portion.

(C) The printing apparatus according to (A) or (B) may further include a medium heating portion that is provided in the medium support portion and that heats the medium after printing.

According to this configuration, the printed medium is heated by the medium heating portion to accelerate drying, and is led out from the medium lead-out portion. Therefore, the dry air blown from the medium lead-out portion is heated by the medium heating portion. Therefore, since the heated dry air is blown to the printing region, even when the printing apparatus is used in a low temperature environment, for example, it is possible to reduce the possibility that dew condensation may occur around the nozzle.

(D) In the printing apparatus according to any one of (A) to (C), the dry air blowing portion may blow the dry air toward the printing region from a medium introduction portion into which the medium before printing is introduced.

According to this configuration, the dry air blowing portion blows the dry air toward the printing region from the medium introduction portion into which the medium before printing is introduced. Therefore, it is possible to reduce the possibility that the outside air containing water vapor may enter through the medium introduction portion.

(E) The printing apparatus according to any one of (A) to (D) may further include a carriage equipped with the liquid ejecting portion and movable in a scanning direction, and the dry air blowing portion may be provided on the carriage.

According to this configuration, the dry air blowing portion is provided on the carriage movable in the scanning direction. Therefore, it is possible to reduce the size of the dry air blowing portion compared to when the dry air blowing portion is provided over the scanning direction, for example.

(F) The printing apparatus according to any one of (A) to (E) may further include a dry air generation portion capable of generating the dry air, and the dry air blowing portion may include a flow path having one end coupled to the dry air generation portion and a dry air blowing nozzle coupled to the other end of the flow path.

According to this configuration, the flow path couples the dry air generation portion and the dry air blowing nozzle. Since the dry air generation portion can be arranged away from the dry air blowing nozzle, the degree of freedom in the arrangement of the dry air generation portion can be increased.

(G) In the printing apparatus according to any one of (A) to (F), the dry air blowing portion may include a dry air heating portion that heats the dry air.

According to this configuration, the dry air heating portion heats the dry air. Since the heated dry air is blown to the printing region, even when the printing apparatus is used in a low temperature environment, for example, it is possible to reduce the possibility that dew condensation may occur around the nozzle.

(H) A printing system includes a printing apparatus including a medium support portion that supports a medium, a liquid ejecting portion that can perform printing by ejecting a liquid containing a solvent from a nozzle to a printing region of the medium supported by the medium support portion, and a dry air blowing portion that can blow dry air toward the printing region, and a dry air generation device that can generate the dry air, in which the dry air blowing portion includes a flow path having one end coupled to the dry air generation device, and a dry air blowing nozzle coupled to the other end of the flow path.

According to this configuration, the same advantageous effects as those of the printing apparatus described above can be obtained.

What is claimed is:

1. An inkjet printing apparatus comprising:

a medium support portion configured to support a medium;

an ink ejecting portion configured to perform printing by ejecting an ink including a solvent from a nozzle to a printing region of the medium supported by the medium support portion;

a housing that contains the ink ejecting portion;

a conveyance portion configured to convey the medium into the housing at a medium entry portion and out of the housing at a medium exit portion; and a dry air blowing portion configured to blow dry air toward the printing region, the dry air blowing portion being configured to blow the dry air into the housing through the medium exit portion toward the printing region.

2. The printing apparatus according to claim 1, further comprising a medium heating portion provided in the medium support portion and configured to heat the medium after printing, and outside of the housing.

3. The printing apparatus according to claim 1, further comprising a carriage equipped with the liquid ejecting portion and configured to move in a scanning direction within the housing, wherein the dry air blowing portion is provided on the carriage.

4. The printing apparatus according to claim 1, further comprising a dry air generation portion configured to generate the dry air, wherein the dry air blowing portion includes a flow path having one end coupled to the dry air generation portion and a dry air blowing nozzle coupled to the other end of the flow path.

5. The printing apparatus according to claim 1, wherein the dry air blowing portion includes a dry air heating portion configured to heat the dry air.

6. The printing apparatus according to claim 1, the dry air blowing portion being configured to blow the dry air into the housing towards the printing region through both of the medium exit portion and the medium entry portion.

7. The printing apparatus according to claim 1, further comprising a medium heating portion provided in the medium support portion and configured to heat the medium after printing, and outside of the housing.

8. The printing apparatus according to claim 1, further comprising a carriage equipped with the liquid ejecting portion and configured to move in a scanning direction within the housing, wherein the dry air blowing portion is provided on the carriage.

9. The printing apparatus according to claim 1, wherein the dry air blowing portion includes a dry air heating portion configured to heat the dry air.

10. An inkjet printing apparatus comprising:

a medium support portion configured to support a medium;

an ink ejecting portion configured to perform printing by ejecting an ink including a solvent from a nozzle to a printing region of the medium supported by the medium support portion;

a housing that contains the ink ejecting portion;

a conveyance portion configured to convey the medium into the housing at a medium entry portion and out of the housing at a medium exit portion; and a dry air blowing portion configured to blow dry air toward the printing region, the dry air blowing portion being configured to blow the dry air into the housing through the medium entry portion toward the printing region.

11. The printing apparatus according to claim 10, further comprising a medium heating portion provided in the medium support portion and configured to heat the medium after printing, and outside of the housing.

12. The printing apparatus according to claim 10, further comprising a carriage equipped with the liquid ejecting portion and configured to move in a scanning direction within the housing, wherein the dry air blowing portion is provided on the carriage.

13. The printing apparatus according to claim 10, further comprising a dry air generation portion configured to generate the dry air, wherein the dry air blowing portion includes a flow path having one end coupled to the dry air generation portion and a dry air blowing nozzle coupled to the other end of the flow path.

14. The printing apparatus according to claim 10, further comprising a dry air generation portion configured to generate the dry air, wherein the dry air blowing portion includes a flow path having one end coupled to the dry air generation portion and a dry air blowing nozzle coupled to the other end of the flow path.

15. The printing apparatus according to claim 10, wherein the dry air blowing portion includes a dry air heating portion configured to heat the dry air.

16. A printing system comprising:

a printing apparatus including a medium support portion configured to support a medium, an ink ejecting portion configured to perform printing by ejecting an ink including a solvent from a nozzle to a printing region of the medium supported by the medium support portion;

a housing that contains the ink ejecting portion;

a conveyance portion configured to convey the medium into the housing at a medium entry portion and out of the housing at a medium exit portion, and the printing system further comprising a dry air blowing portion configured to blow dry air toward the printing region; and a dry air generation device configured to generate the dry air, wherein the dry air blowing portion includes a flow path having one end coupled to the dry air generation device; and a dry air blowing nozzle coupled to the other end of the flow path, the dry air blowing portion being configured to blow the dry air into the housing towards the printing region through at least one of the medium exit portion and the medium entry portion.

* * * * *